Figure 1:
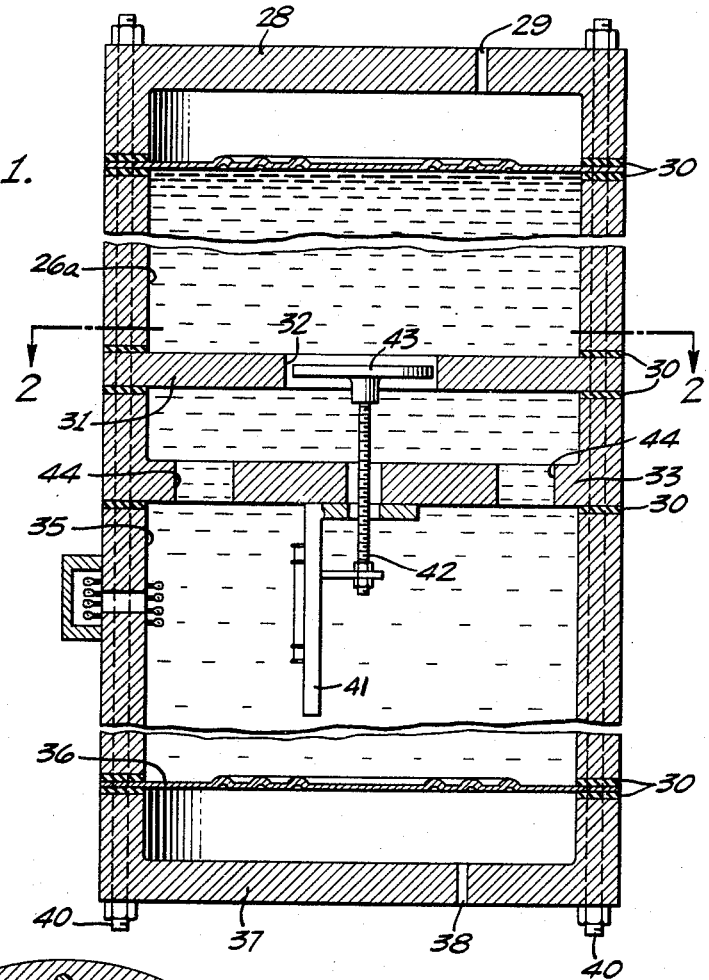

June 28, 1960

L. D. STATHAM 2,942,474

MOTION SENSING DEVICE

Original Filed Aug. 13, 1951

INVENTOR.
LOUIS D. STATHAM

United States Patent Office 2,942,474
Patented June 28, 1960

2,942,474
MOTION SENSING DEVICE

Louis D. Statham, Beverly Hills, Calif., assignor to Statham Instruments, Inc., a corporation of California Original application Aug. 13, 1951, Ser. No. 241,539, now Patent No. 2,778,905, dated Jan. 22, 1957. Divided and this application Nov. 21, 1956, Ser. No. 623,741

8 Claims. (Cl. 73—516)

This application is a division of application Serial No. 241,539, filed August 13, 1951, now Patent No. 2,778,905.

This invention relates to motion responsive devices for indicating and recording the magnitude and nature of motion. It belongs to the general class of vibrometers, velocitometers and accelerometers.

In the classic example of such systems, a spring suspended mass is damped by means of a liquid in which it is suspended. It is characteristic of such systems that they are critically limited in the frequency to which they will faithfully respond and this response is dependent upon temperature, since the viscous damping changes with temperature.

I have devised a motion responsive device based on an inertial mass which is subject to viscous damping in which the damping coefficient may be set at a desired value which will be sensibly constant or vary but within small limits over wide variations in temperature.

I obtain this advantageous result by employing, instead of a solid mass suspended on springs, as in the prior art, a liquid mass whose displacement, relative to a container subjected to the motion to be sensed by the instrument, is measured.

Since I use a liquid mass instead of a solid inertial mass, I may use a large mass without introducing a large hinge, such as would be necessary were I to use a solid mass of equivalent weight. Such a large weight would require a large hinge or pivots or springs in order to withstand mechanical shocks. Because, as stated above, I use as the effective inertial mass a liquid mass and do not employ a solid mass as the effective inertial mass, I avoid the use of hinges of the size that would be required if such solid masses were used.

The motion of the liquid mass in the container is damped because of the viscous drag of the liquid in the container when the differential motion of the container and fluid is obtained by the displacement of the container in space. This viscous drag is dependent upon the viscosity of the liquid and will increase with increase of viscosity resulting from a decrease in temperature. In order to overcome this variation in damping coefficient, I have added to the aforesaid damping of the liquid, a damping effect which decreases as the viscosity increases. The principles of this effect are discussed in said U.S. Letters Patent No. 2,778,905, to which reference is made. By proportioning the aforesaid components of the damping so that the increase of one of the components of the damping balances the decrease of the other, I have been able to devise a system in which the damping coefficient is maintained constant for all practical purposes over wide ranges of temperature.

The maintenance of a substantially constant damping coefficient over such wide ranges of temperature insures that the device will be as faithfully responsive to as wide a range of frequencies of motion at high and at low temperatures as it is at ordinary temperatures. This is important in motion sensing devices which may be subjected to wide and perhaps rapid temperature variations.

In the preferred embodiment of my invention I form the orifice as a peripheral crack between the edge of an orifice plate or other member which will partially obstruct or close the orifice and the peripheral edge of a hole in a barrier wall mounted in the liquid container. The orifice plate is connected to a motion sensing device. The peripheral crack or peripheral orifice, as it will hereafter be called, may be circular, square, or have any other geometric form depending on the geometry of the plate and the similar geometry of the hole. The acceleration of the case causes a relative motion of the liquid and the case, a portion of the liquid leaking through the peripheral orifice. The plate, because the liquid is substantially the effective inertial mass of the instrument, is displaced as a result of a pressure differential across the wall caused by this relative motion of the liquid and case. Means are provided which will respond to and measure the degree of displacement.

Figure 2:
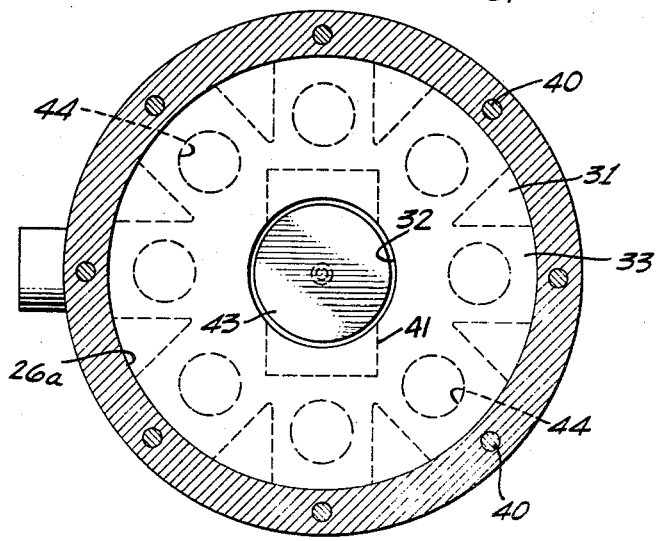

This invention will be further described by reference to the accompanying drawings, in which:

Fig. 1 is a vertical section of the unit; and
Fig. 2 is a section taken on line 2—2 of Fig. 1.

A cylindrical chamber 26a is closed by a flexible diaphragm and by cap 28 vented to atmosphere by vent 29. Suitable gaskets 30 hold the diaphragm fluid-tight. A barrier 31 having an orifice 32 is mounted beneath the cylinder 26a. A spider 33 is mounted below the barrier wall 31 and above the cylinder 35 which is closed by a diaphragm 36 and a cap 37 vented to atmosphere via 38, all suitably sealed by gaskets 30 and held together by bolts 40. An electric strain gage 41 of the reciprocable type illustrated in Patent No. 2,453,551 is mounted on the spider 33 mounted between said cylindrical chambers 35 and 26a. The armature of the gage is connected to a rod 42 which carries a paddle 43 concentrically positioned.

On linear acceleration of the device, the liquid which fills the case formed by the walls and ends of the compartment moves relatively to the container through the holes 44 and the port 32 and causes a vertical deflection of the paddle in the orifice plate 31. A portion of the flow is through the peripheral gap between the edge of the paddle 43 and the edge of the hole 32.

While I have shown an electrical strain gage as the preferred form of the device for sensing the motion of the paddle, my invention is not restricted to this form of sensing device. Those skilled in the art will recognize that other conventional motion sensing devices may be mounted in the device of my invention to indicate the displacement of the paddle.

While I have described a particular embodiment of my invention for the purpose of illustration, it should be understood that various modifications and adaptations thereof may be made within the spirit of the invention as set forth in the appended claims.

I claim:

1. In a motion responsive device, a cylindrical chamber, a liquid confined within said chamber, a flexible diaphragm closure secured at the upper end of said cylindrical chamber, a flexible diaphragm closure secured at the lower end of said chamber, a barrier wall between the walls of said cylindrical chamber positioned between said upper and lower closure diaphragms, an orifice in said barrier located centrally of said barrier wall, a paddle of a lesser area than the said orifice located within the confines of said orifice and movable therein, the peripheral edges of said paddle being spaced from the edges of said orifice, an electrical strain gage mounted in said chamber, and a stem connecting the above mentioned paddle to the armature of said strain gage.

2. In a motion responsive device, a cylindrical chamber, a liquid confined within said chamber, a flexible diaphragm closure secured at the upper end of said cylindrical chamber, a flexible diaphragm closure secured at the lower end of said chamber, a barrier wall in said chamber and having a restricted fluid passage therein, a pressure difference indicator in said chamber, said indicator including a movable member responsive to differences in liquid pressure in said chamber on differential motion between said liquid and said chamber and passage, resulting from motion of the chamber in space transversely of said diaphragm closures.

3. In a motion responsive device, a pair of compartments, a wall separating said compartments, an orifice in said wall, liquid positioned in said compartments, a circulating channel for said liquid in said compartments and through said orifice, movable means positioned in said liquid, the motion of said movable means being responsive to pressure differences across said orifice on acceleration of said compartments in a direction to produce said pressure differences, a transducer connected to said compartments responsive to said motion, and a motion transmitting connection between said movable means and said transducer.

4. In a motion responsive device, a pair of compartments, a wall separating said compartments, an orifice in said wall, liquid positioned in said compartments, a circulating channel for said liquid in said compartments and through said orifice, movable means positioned in said orifice, the motion of said movable means being responsive to pressure differences across said orifice on acceleration of said compartments, a transducer connected to said compartments responsive to said motion, and a motion transmitting connection between said movable means and said transducer.

5. A motion responsive device, comprising a case, a pair of compartments in said case, a wall in said case separating said compartments, an orifice in said wall, liquid in said compartments, said liquid on acceleration of said case circulating in said compartments, a portion of said circulation of liquid passing through said orifice from compartment to compartment, movable means positioned in said case responsive to the differences in pressure across said orifice on said acceleration in a direction to produce said pressure differences, a transducer in said case, and a motion transmitting connection between said movable means and said transducer.

6. A motion responsive device, comprising a case, a pair of compartments in said case, a wall in said case separating said compartments, an orifice in said wall, liquid in said compartments, said liquid on acceleration of said case circulating in said compartments, a portion of said circulation of liquid passing through said orifice from compartment to compartment, movable means positioned in said liquid and responsive to the differences in pressure across said orifice on said acceleration in a direction to produce said pressure differences, a transducer in said case, and a motion transmitting connection between said movable means and said transducer.

7. A motion responsive device, comprising a case, a pair of compartments in said case, a wall in said case separating said compartments, an orifice in said wall, liquid in said compartments, said liquid on acceleration of said case transversely of said orifice circulating in said compartments, a portion of said circulation of liquid passing through said orifice from compartment to compartment, movable means positioned in said orifice responsive to the differences in pressure across said orifice on said acceleration, a transducer in said case, and a motion transmitting connection between said movable means and said transducer.

8. In a motion responsive device, a cylindrical chamber, a liquid confined within said chamber, a flexible diaphragm closure secured at the upper end of said cylindrical chamber, a flexible diaphragm closure secured at the lower end of said chamber, a barrier wall between the walls of said cylindrical chamber positioned between said upper and lower closure diaphragms, an orifice in said barrier located centrally of said barrier wall, a paddle of a lesser area than the said orifice located within the confines of said orifice and movable therein, the peripheral edges of said paddle being spaced from the edges of said orifice, a transducer mounted in said chamber, and a motion transmitting connection between said paddle and said transducer.

References Cited in the file of this patent

UNITED STATES PATENTS 2,615,940     Williams     Oct. 28, 1952
2,789,192     White     Apr. 16, 1957